Patented Dec. 5, 1950

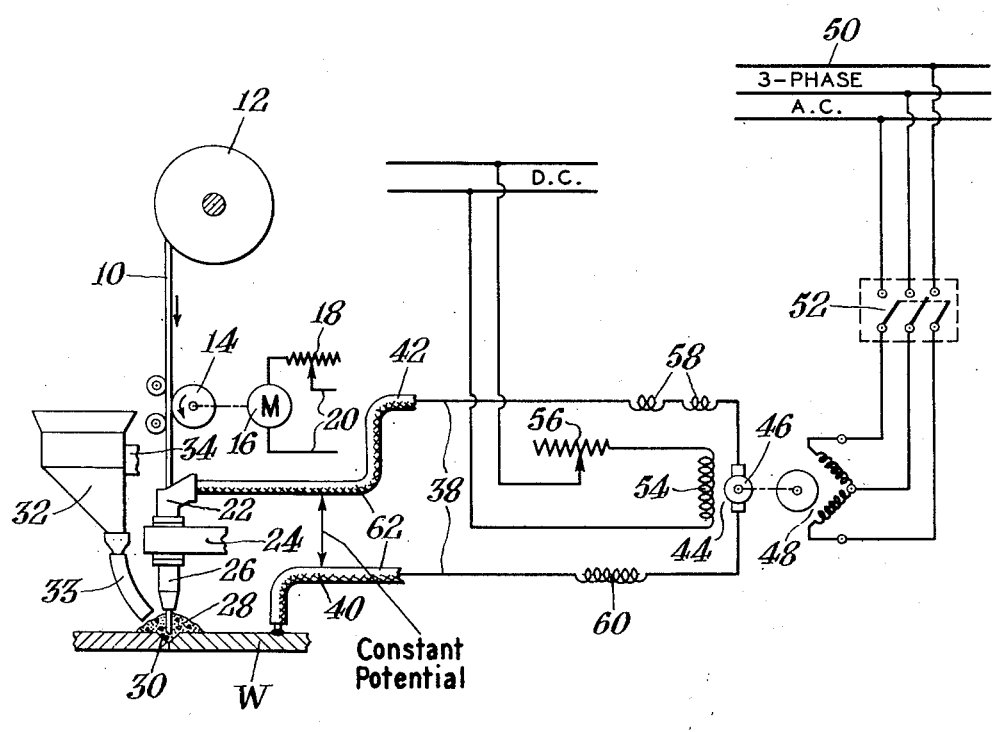

2,532,411

UNITED STATES PATENT OFFICE 2,532,411

CONSTANT-POTENTIAL SUBMERGED-MELT METAL-ARC WELDING

Harry E. Kennedy, Berkeley, Calif., assignor to The Linde Air Products Company, a corporation of Ohio Application October 29, 1949, Serial No. 124,400

4 Claims. (Cl. 219—8)

This invention relates to electric welding, and more particularly to submerged-melt metal-arc welding in which a metal electrode is fed toward the work through a layer of granular flux which is non-conductive when cold but is conductive and fuses during the welding operation.

The resistance of an arc decreases as the current increases. This is so because the degree of ionization increases with increased current. Therefore, the IR drop in the arc decreases as the current increases. This results in instability of the arc unless compensatory means are included in the circuit. In order to render an arc stable it is customary to include an element in the circuit with a characteristic opposite to the arc, such as a suitable resistor, or an inductance, or a specially designed generator. Electric welding generators are usually constructed so as to have a relatively high open circuit voltage which decreases when current is being drawn. Such current is predetermined by the characteristics of the circuit; the welding voltage, by the length of the arc.

In automatic metal-arc welding a continuous electrode is fed to the welding zone at an automatically variable rate so as to maintain the voltage across the arc at a predetermined substantially constant value. In the past, submerged metal-arc welding circuits were designed to supply current to the arc with a decidedly drooping voltage characteristic, the open circuit voltage being considerably higher than the welding voltage, and the voltage applied to the arc falling rapidly with any increase in welding current. This was intended to stabilize the welding operation, but in order to obtain satisfactory welding, the arc-voltage was maintained substantially constant by automatically changing the rate of rod-feed. The necessary equipment for this purpose was expensive to buy and to keep in good working order. Also, stabilizing resistors used up a considerable amount of power, but stable metal-arc welding with a coated electrode or with a bare electrode in air was impossible without at least a series-resistor or reactance for this purpose in the welding circuit.

I have discovered that it is possible and desirable to energize an automatic metal-arc welding process from a constant potential source of welding current provided the welding arc is submerged in a granular flux which fuses and forms a mantle of vapor about the arc during welding. By so doing costly and complicated control equipment is eliminated, starting is made easy and great uniformity of welding results. In order to do this a device for continuously feeding the metal electrode at a preselected rate is used. The power source is a constant-potential generator having a current supplying capacity of the order of 19,000–81,000 amperes per square inch of welding rod cross-section. Direct current is preferred. The particular type of machine is of little consequence. A flat-compound machine is entirely suitable, or a voltage regulator may be connected to an ordinary welding generator so as to maintain a constant voltage. The need for any current limiting device under these conditions is eliminated and the generator is separately excited. It should be emphasized that unlike prior welding systems, in the present invention the open circuit voltage is substantially equal to the welding voltage. Electrocutions have resulted by accidental contact with electrical welding equipment, especially in damp locations. In the present system such accidents are most unlikely, because of the greatly reduced open circuit voltage (25–45 volts).

The rate at which the welding rod is fed to the welding zone determines the current, which may be adjusted by adjusting the speed of the rod to any desired value within the capacity of the machine. The welding voltage may be adjusted to any desired value without altering the current. This combination is found to be very effective in mechanized submerged arc welding. As in ordinary welding, the electrode size should be chosen for the range of current to be used. A current density of the order of 19,000–81,000 amperes per square inch of rod cross-section is entirely satisfactory.

The present method of automatic submerged melt welding makes possible a much higher current output from a given sized generator. Fewer armature conductors are required because of the lower open circuit voltage. Therefore, their cross-section can be correspondingly increased. The welding machine need not have a current controlling device and the rod-feed mechanism need have no automatic control.

In the drawing the single figure is a diagrammatic view, partly in elevation, of a submerged melt metal-arc welding system illustrating the invention.

As shown in the drawing a welding rod or wire 10 is fed at a substantially constant rate from a reel 12 by a drive wheel 14 which is driven by a rod feed motor 16. The speed of the motor 16 can be set as desired by adjustment of a rheostat 18 in the input circuit 20 thereof. The rod 10 is driven through a head 22, carried by a support 24, which is mounted on a carriage or suitable machine which is adapted to move the support above the work W and along the path to be welded at the proper speed. The head 22 includes a nozzle 26 through which the rod 10 passes and from which the rod is discharged into a mound 28 of inert, granular, fusible, welding flux. The flux is supplied to the welding zone 30 from a hopper 32 through a hose 33. The hopper 32 is carried by a support 34 which also is mounted on the carriage mounting the head support 24.

The work W is connected to a constant potential welding current source 38 by a lead such as an insulated conductor 40 having as little resistance as possible. Similarly, the welding head 22 is connected to the source 38 by a lead such as an insulated conductor 42 of low resistance.

While any source of constant potential welding current can be used, a flat-compound generator 44 has proved to be highly satisfactory. The generator 44 comprises an armature 46 which is driven by a constant speed A. C.-motor 48. The motor 48 is connected to a suitable power line 50 through a switch 52. The shunt field winding 54 of the generator is energized by a suitable source of direct current, DC, through a rheostat 56. The interpole windings 58 and the series field winding 60 of the generator are connected in series with the output circuit 62 which includes the low-resistance conductors 40 and 42, the rod 10 and the work W.

The generator 44 is designed so that the voltage-current output characteristic curve thereof is substantially flat, i. e. does not vary more than ±3 volts between no-load and full load current values, the full load voltage being substantially equal to the open circuit voltage. No stabilizing resistance or reactance is used in the welding current circuit, the arc-voltage being about equal to the generator voltage and being kept as constant as possible during the operation of the system.

The stability of the welding operation is made possible by the vapor mantle formed in the fused flux about the arc. Numerous welds were made according to the invention on 12 and 14-gauge steel with excellent results. With $\frac{1}{16}''$ and $\frac{3}{32}''$ rods of steel carrying 250 amperes, i. e., at current densities of 81,000 and 36,000 amperes per square inch of rod cross-section, respectively; and fed at 100 inches per minute continuous beads were obtained. There was none of the skipping present which is usually experienced with the prior standard type voltage control. Each bead was $\frac{1}{8}''$ wide and approximately $\frac{1}{16}''$ high. Probably the most noticeable feature was that in welding 12 and 10-gauge steel with small diameter rod, the fused material at the root of the weld did not show the usual cold casting experienced with the old type of welding where the voltage regulated the rod feed. Instead, Instead, there seems to be a beneficial "wetting" action.

The welding action is similar to that disclosed in Patent 2,043,960 to Jones, Kennedy and Rotermond, except that no automatic voltage control device is necessary. Nor is any rod feed control necessary, the rod being fed at any desired constant speed by the motor 16.

The granular flux blanket has the remarkable effect, in the current density range of 19,000–81,000 amperes per square inch of rod cross-section, of stabilizing the welding operation, making it unnecessary to use any resistance or reactance in the welding circuit for this purpose. This greatly simplifies the system. Complicated and expensive rod-feed controls are eliminated, the rod being fed to the welding zone at a constant rate by a simple motor, the speed of which can be adjusted manually as desired.

I claim:

1. A constant potential metal-arc welding system comprising a constant potential source of welding current having a current supplying capacity of the order of 19,000–81,000 amperes per square inch of welding rod cross-section, means for feeding a bare welding rod composed of metal at a constant rate toward a welding zone on work composed of metal, leads connecting said source of welding current directly to the work and to the welding rod, so that welding current flows through such rod and the work at a current density of the order of 19,000–81,000 amperes per square inch of welding rod cross-section, forming a welding arc which fuses the end of the rod and the adjacent metal of the work, and means supplying a granular flux medium to such welding zone which in such current density range stabilizes the welding arc, whereby for a rod of given size the amount of welding current inherently depends upon the speed at which such rod is fed toward the welding zone, and the resulting welding operation is so stable that the need for rod feed and voltage controls, as well as stabilizing resistors and reactors in the welding circuit is eliminated.

2. Process of metal-arc welding which comprises connecting metal work to be welded to one side of a constant potential source of welding current having a current supplying capacity of the order of 19,000–81,000 amperes per square inch of welding rod cross-section, connecting a bare welding rod composed of metal to the other side of said constant potential source of welding current, covering the end of said rod and the adjacent metal to be welded with an inert granular flux medium which in such current density range effectively stabilizes the arc, feeding said rod toward the work at a substantially constant rate, supplying welding current to such rod at a current density of the order of 19,000–81,000 amperes per square inch of welding rod cross-section, and fusing the end of such rod and the adjacent work metal in the welding zone in accordance with the rate of feed of said welding rod, the effect of such inert granular flux medium in such current density range being to stabilize the welding operation.

3. Process of welding metal work under a blanket of inert granular fusible flux which is non-conductive when cold, which comprises connecting a bare welding rod of metal to one side of a source of welding current having a substantially constant potential between no-load and full load current values, said source having a current supplying capacity of the order of 19,000–81,000 amperes per square inch of welding rod cross-section, connecting the work to the other side of said source of welding current, feeding a stream of inert granular fusible flux on the work in the zone to be welded, feeding said welding rod through such flux toward the work at a substantially constant rate, supplying welding current to such rod at a current density of the order of 19,000–81,000 amperes per square inch of welding rod cross-section, fusing the end of the welding rod, the flux and the adjacent metal of the work under such flux, and moving the rod and granular flux stream over the work along a desired path, the amount of welding current supplied by said source being a direct function of the rate at which the rod is fed toward the welding zone, and the fused flux having the beneficial effect in such current density range of stabilizing the welding operation.

4. A constant-potential submerged-melt metal-arc welding process which comprises discharging a stream of inert granular fusible flux which is non-conductive when cold, on metal work to be welded along a desired path, applying a potential of between 25 and 45 volts of a welding current source across a bare metal welding rod and the work, feeding such rod at a substantially constant rate toward the work through such stream of flux, fusing the end of the rod and the flux and the adjacent work metal with welding current flowing through such rod and the intervening flux and the work at a current density of the order of 19,000–81,000 amperes per square inch of welding rod cross-section, moving the rod along such path while maintaining the rod-feed at such rate, and maintaining the potential applied across the rod and the work to within ±3 volts of the voltage applied thereto prior to starting the process, the welding arc being stabilized in such current density range by the vapor mantle which is formed thereabout in the fused flux.

HARRY E. KENNEDY.

REFERENCES CITED

The following references are of record in the file of this patent:

UNITED STATES PATENTS

| Number | Name | Date |
|---|---|---|
| 1,483,612 | Morton | Feb. 12, 1924 |
| 2,300,670 | Hopkins | Nov. 3, 1942 |
| 2,332,950 | Tannheim | Oct. 26, 1943 |
| 2,430,055 | Kennedy | Nov. 4, 1947 |